United States Patent
Tomida

(10) Patent No.: US 10,812,670 B2
(45) Date of Patent: Oct. 20, 2020

(54) IMAGE FORMING APPARATUS, INFORMATION PROCESSING SYSTEM, AND NON-TRANSITORY COMPUTER READABLE MEDIUM FOR CHARGING USAGE FEES

(71) Applicant: FUJI XEROX CO., LTD., Tokyo (JP)

(72) Inventor: Munenori Tomida, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/538,390

(22) Filed: Aug. 12, 2019

(65) Prior Publication Data
US 2020/0286052 A1 Sep. 10, 2020

(30) Foreign Application Priority Data
Mar. 4, 2019 (JP) .................................. 2019-038759

(51) Int. Cl.
*H04N 1/00* (2006.01)
(52) U.S. Cl.
CPC ..... *H04N 1/00344* (2013.01); *H04N 1/00244* (2013.01); *H04N 1/00477* (2013.01); *H04N 2201/0094* (2013.01)
(58) Field of Classification Search
CPC ............................................... H04N 1/34–348
See application file for complete search history.

(56) References Cited

U.S. PATENT DOCUMENTS

| 6,891,636 B1* | 5/2005 | Kawai | G06Q 30/02 358/1.12 |
| 2002/0035546 A1* | 3/2002 | Aoki | H04M 15/68 705/52 |
| 2002/0041394 A1* | 4/2002 | Aoki | G06Q 20/322 358/1.15 |
| 2002/0073002 A1* | 6/2002 | Horii | B41J 2/17566 705/29 |
| 2008/0162172 A1* | 7/2008 | Iwaki | H04N 1/00347 705/1.1 |
| 2009/0027722 A1* | 1/2009 | Tsujimoto | G06F 3/1285 358/1.15 |
| 2009/0265286 A1* | 10/2009 | Nagarajan | G07F 17/26 705/400 |

(Continued)

FOREIGN PATENT DOCUMENTS

JP 2014-178899 A 9/2014

*Primary Examiner* — Nicholas Pachol
(74) *Attorney, Agent, or Firm* — Oliff PLC

(57) ABSTRACT

An image forming apparatus includes an image output unit, an image reading unit, and a controller. The image output unit outputs an image on a recording medium. The image reading unit reads an image on a recording medium. The controller charges a first user for a fee so as to output mixed images from the image output unit. The mixed images have a first image and a second image. The first image is an image for which the first user is to pay an output fee. The second image is an image for which a second user is to pay an output fee. The second user is a charge destination different from a charge destination of the first user. When the image reading unit reads the second image for which the second user is to pay the output fee, the controller switches an output fee for the image read by the image reading unit, from the output fee charged to the first user, to the output fee that is to be paid by the second user.

17 Claims, 18 Drawing Sheets

(56) References Cited

U.S. PATENT DOCUMENTS

| | | | | |
|---|---|---|---|---|
| 2012/0136760 | A1* | 5/2012 | Hur | H04N 1/00 |
| | | | | 705/30 |
| 2012/0147412 | A1* | 6/2012 | Tsujimoto | G06F 3/1213 |
| | | | | 358/1.14 |
| 2013/0235418 | A1* | 9/2013 | Tanaka | G06F 3/1287 |
| | | | | 358/1.15 |
| 2013/0242334 | A1* | 9/2013 | Ichida | G06F 21/608 |
| | | | | 358/1.14 |
| 2014/0218764 | A1* | 8/2014 | Murata | H04N 1/00 |
| | | | | 358/1.15 |
| 2014/0253947 | A1* | 9/2014 | Akutsu | H04N 1/00973 |
| | | | | 1/973 |
| 2015/0015908 | A1* | 1/2015 | Tanaka | H04N 1/4413 |
| | | | | 358/1.14 |
| 2015/0036176 | A1* | 2/2015 | Naruse | H04N 1/00925 |
| | | | | 358/1.15 |
| 2017/0006183 | A1* | 1/2017 | Tagaki | H04N 1/00832 |
| 2017/0295295 | A1* | 10/2017 | Imai | H04N 1/0057 |

* cited by examiner

FIG. 8

| USER ID | CORPORATE ID | CORPORATE NAME |
|---|---|---|
| 10012345 | 9301 | XXX CO. |
| 10012346 | 9301 | XXX CO. |
| 10012347 | 9302 | ABC INC. |
| 10012348 | 9302 | ABC INC. |

FIG. 9

| CORPORATE ID | COLOR MODE | SHEET SIZE | UNIT PRICE |
|---|---|---|---|
| 9301 | COLOR | A4 | 40 YEN |
| 9301 | BLACK AND WHITE | A4 | 20 YEN |
| 9302 | COLOR | A4 | 50 YEN |
| 9302 | BLACK AND WHITE | A4 | 25 YEN |

FIG. 10

| USER ID | REGISTRATION DAY, HOUR, MINUTE, AND SECOND | COLOR MODE | SHEET SIZE | PAGE COUNT | STORAGE DESTINATION OF SCANNED DATA |
|---|---|---|---|---|---|
| 10012345 | 20181026091030 | COLOR | A4 | 2 PAGES | D:¥Userdata¥12345¥scan01.jpeg |
| 10012348 | 20181115203619 | BLACK AND WHITE | A3 | 5 PAGES | D:¥Userdata¥12123¥scan04.jpeg |
| 10013588 | 20181225105649 | COLOR | A4 | 6 PAGES | D:¥Userdata¥12222¥scan07.jpeg |

FIG. 11

XX Printing

Input a registration number which has been issued.
Print data corresponding to the input registration number will be downloaded.

Input a registration number.

AQ745JY2F

Print

Back

| total page count | pages |
| total fee | yen |
| unpaid balance | yen |

IMAGE FORMING APPARATUS, INFORMATION PROCESSING SYSTEM, AND NON-TRANSITORY COMPUTER READABLE MEDIUM FOR CHARGING USAGE FEES

CROSS-REFERENCE TO RELATED APPLICATIONS

This application is based on and claims priority under 35 USC 119 from Japanese Patent Application No. 2019-038759 filed Mar. 4, 2019.

BACKGROUND (i) Technical Field

The present disclosure relates to an image forming apparatus, an information processing system, and a non-transitory computer readable medium.

(ii) Related Art

Japanese Unexamined Patent Application Publication No. 2014-178899 discloses an information processing apparatus which limits a user's use of an image forming apparatus. The information processing apparatus includes a charge method controller that causes a user to select a charge using a first method or a charge using a second method.

SUMMARY

Aspects of non-limiting embodiments of the present disclosure relate to an image forming apparatus, an information processing system, and a non-transitory computer readable medium which enable a first user and a second user to be charged for corresponding fees for image output even when mixed image output including image output, for which the first user is to pay the fee, and image output, for which the second user is to pay the fee, is performed at the same time.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including an image output unit, an image reading unit, and a controller. The image output unit outputs an image on a recording medium. The image reading unit reads an image on a recording medium. The controller charges a first user for a fee so as to output mixed images from the image output unit. The mixed images have a first image and a second image. The first image is an image for which the first user is to pay an output fee. The second image is an image for which a second user is to pay an output fee. The second user is a charge destination different from a charge destination of the first user. When the image reading unit reads the second image for which the second user is to pay the output fee, the controller switches an output fee for the image read by the image reading unit, from the output fee charged to the first user, to the output fee that is to be paid by the second user.

BRIEF DESCRIPTION OF THE DRAWINGS

Exemplary embodiment of the present disclosure will be described in detail based on the following figures, wherein:

FIG. 8 is a diagram illustrating an exemplary user ID management table stored in a management information storage unit;

FIG. 9 is a diagram illustrating an exemplary unit price table stored in a management information storage unit;

FIG. 10 is a diagram illustrating exemplary scanned-data management information stored in a management information storage unit;

FIG. 11 is a diagram for describing a concrete operation screen example on an image forming apparatus;

DETAILED DESCRIPTION

Figure 1:
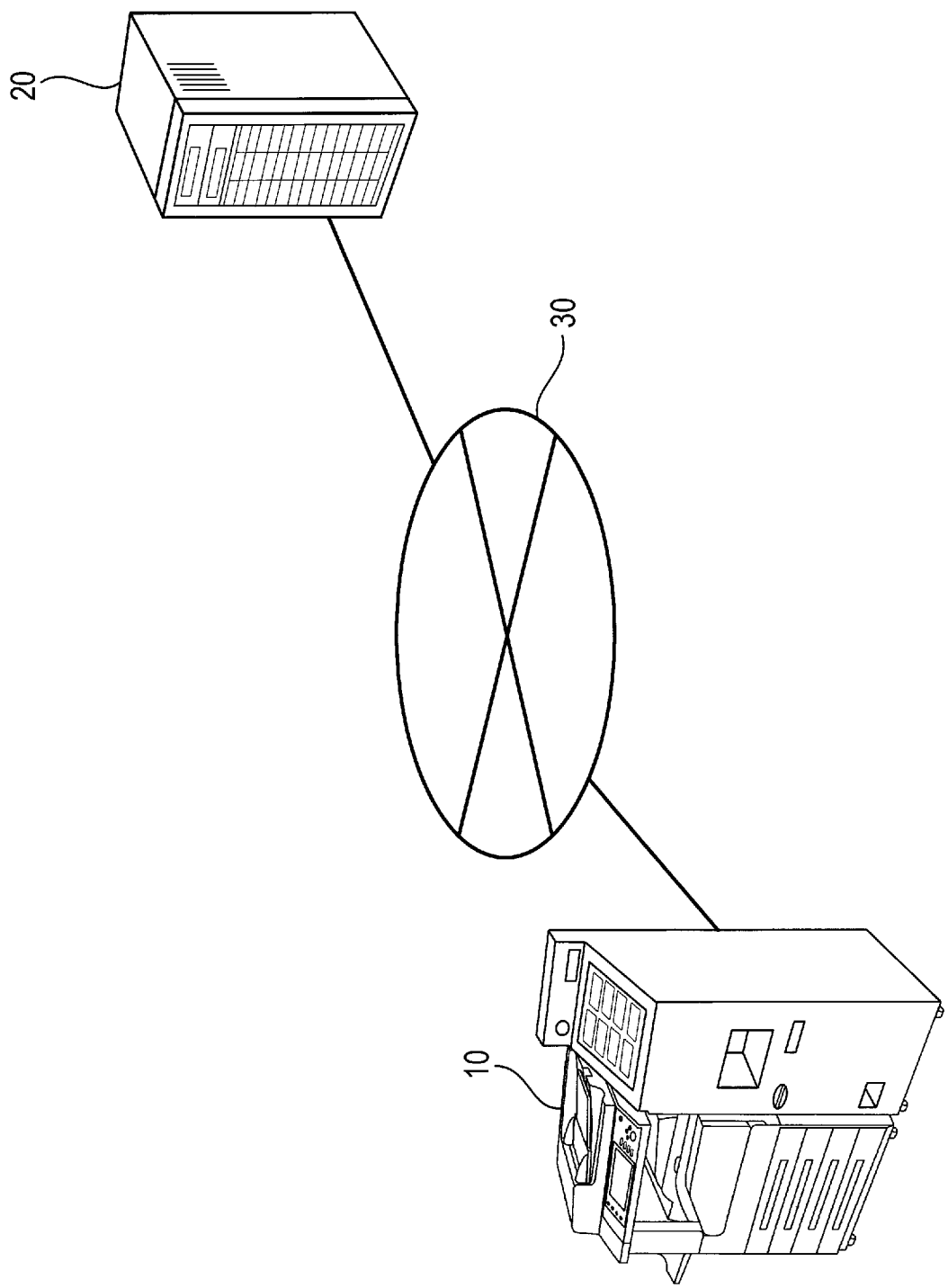
FIG. 1 is a diagram illustrating the system configuration of an image forming system according to an exemplary embodiment of the present disclosure.

An exemplary embodiment of the present disclosure will be described in detail by referring to the drawings.

FIG. 1 is a diagram illustrating the configuration of an image forming system according to an exemplary embodiment of the present disclosure.

As illustrated in FIG. 1, the image forming system according to the present exemplary embodiment has a configuration in which an image forming apparatus 10 is connected to a management server 20 over a network 30.

The image forming apparatus 10, which is installed, for example, in a convenience store, has a configuration in which a user themselves may pay their fees so as to use various services, such as copying, faxing, and photograph printing.

In addition, a user may register in advance an image, which is to be printed, in the management server 20, which is a management apparatus, and may go to the image forming apparatus 10 to download, for printing, the image data which has been registered in the management server 20.

Specifically, when a user registers in advance image data, which is to be printed, in the management server 20, for example, from a personal computer in their home or office, a registration number is issued. When the user goes to the image forming apparatus 10 and inputs the issued registration number to the image forming apparatus 10, the image data associated with the registration number may be downloaded, for printing, to the image forming apparatus 10.

The image forming apparatus 10 is an apparatus called a so-called multifunction device having functions, such as a printing function, a scanning function, a copying function, and a faxing function. The image forming apparatus 10 is connected to an operation terminal having a user interface function using a touch panel, a fee payment function, and the like.

Figure 2:
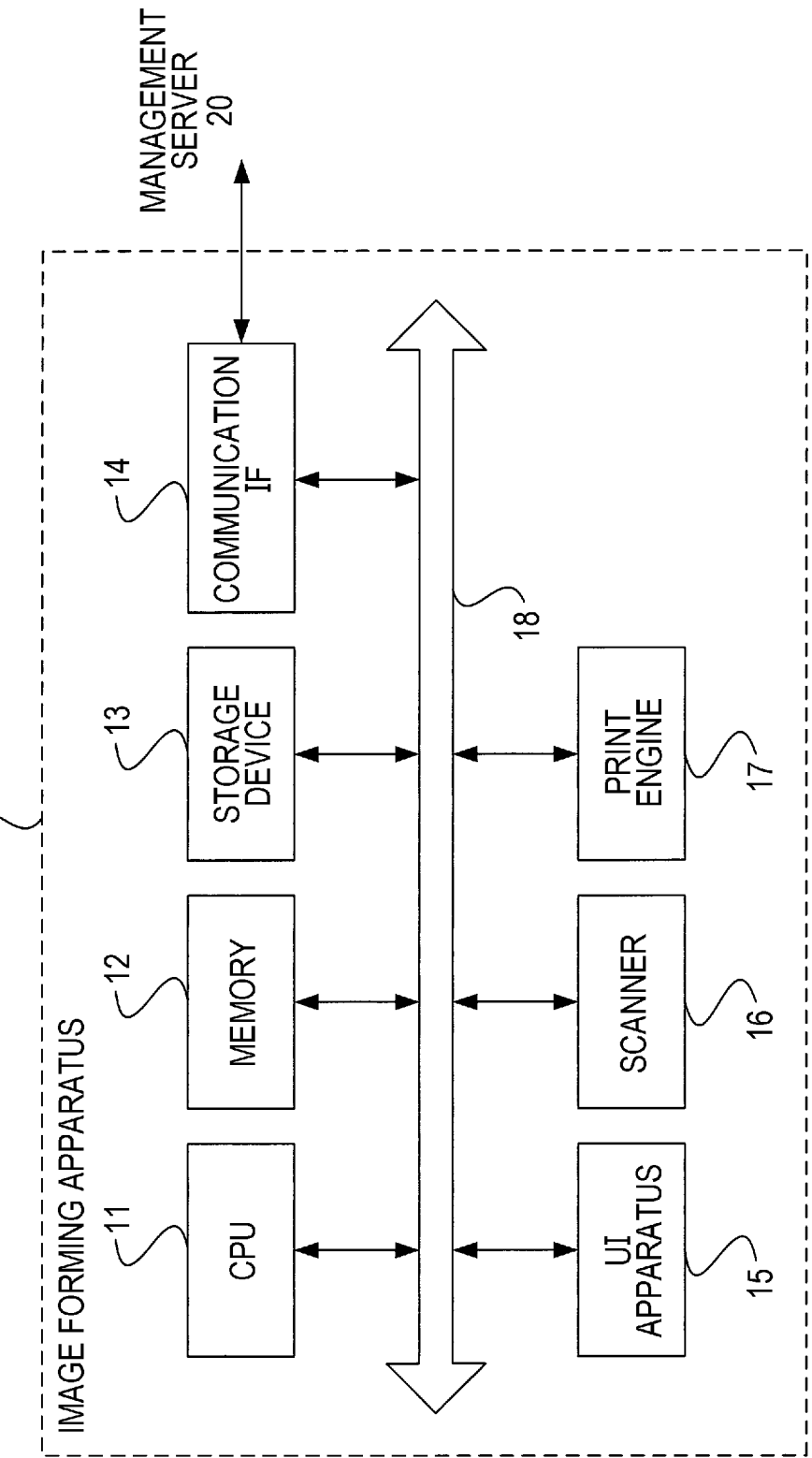
FIG. 2 is a block diagram illustrating the hardware configuration of an image forming apparatus according to an exemplary embodiment of the present disclosure.

FIG. 2 illustrates the hardware configuration of the image forming apparatus 10 in the image forming system according to the present exemplary embodiment.

As illustrated in FIG. 2, the image forming apparatus 10 includes a central processing unit (CPU) 11, a memory 12, a storage device 13 such as a hard disk drive, a communication interface (abbreviated as IF) 14 receiving/transmitting data from/to the management server 20 and other external apparatuses over a communication network, a user interface (abbreviated as UI) apparatus 15 such as a touch panel, a scanner 16, and a print engine 17. These components are connected to each other through a control bus 18.

The CPU 11 performs given processes on the basis of control programs, which are stored in the memory 12 or the storage device 13, so as to control operations of the image forming apparatus 10. In the present exemplary embodiment, the CPU 11 reads and executes the control programs stored in the memory 12 or the storage device 13. Alternatively, the programs may be stored in a storage medium, such as a Universal Serial Bus (USB) memory or a compact disc-read-only memory (CD-ROM), so as to be provided to the CPU 11.

Figure 3:
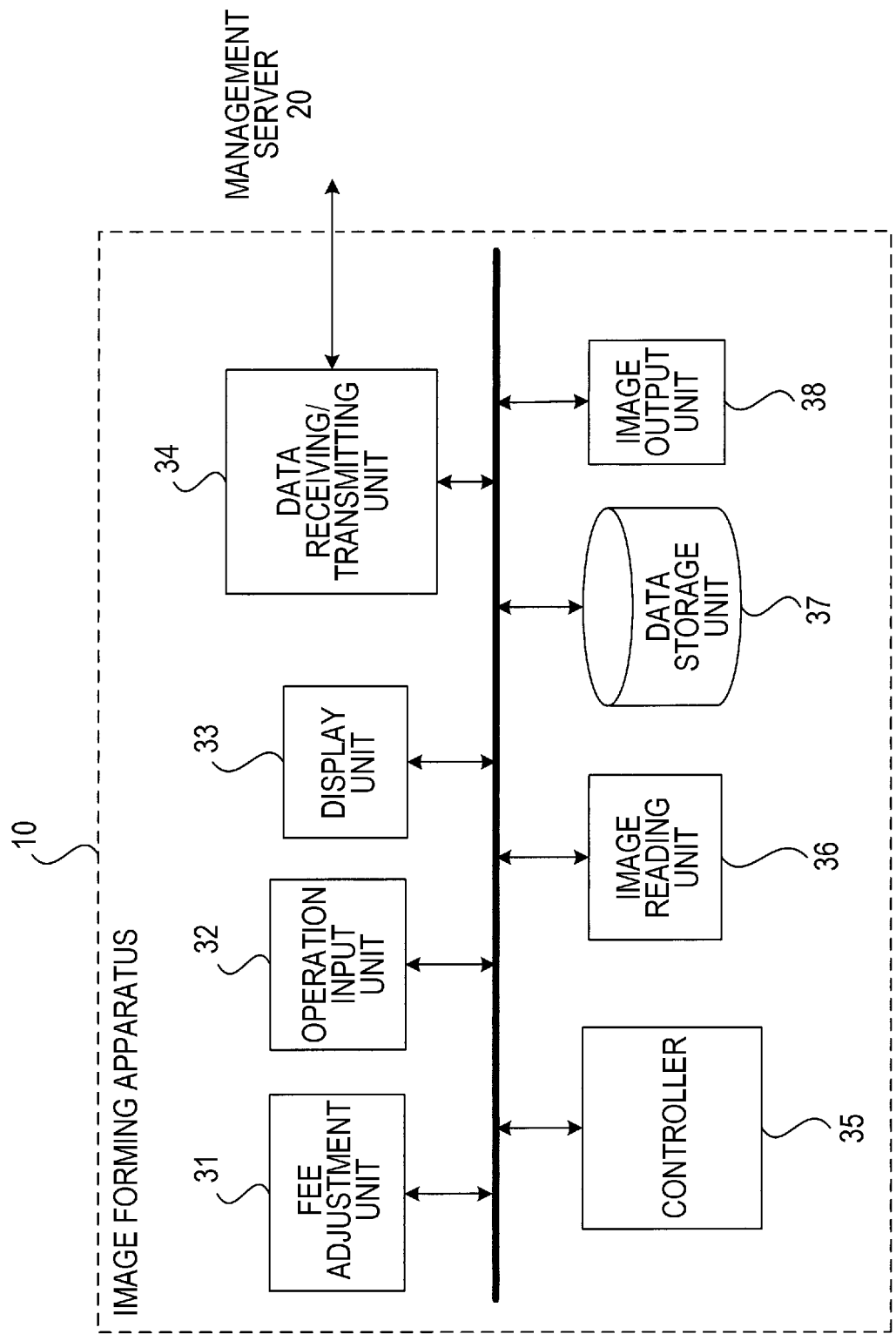
FIG. 3 is a block diagram illustrating the functional configuration of an image forming apparatus according to an exemplary embodiment of the present disclosure.

FIG. 3 is a block diagram illustrating the functional configuration of the image forming apparatus 10 which is implemented through execution of the control programs.

As illustrated in FIG. 3, the image forming apparatus 10 according to the present exemplary embodiment includes a fee adjustment unit 31, an operation input unit 32, a display unit 33, a data receiving/transmitting unit 34, a controller 35, an image reading unit 36, a data storage unit 37, and an image output unit 38.

The data storage unit 37 is a memory for temporarily storing intermediate print data and the like produced in a process performed by the controller 35.

The fee adjustment unit 31 has a function of adjusting a fee for a service provided to a user. Specifically, the fee adjustment unit 31 receives a fee from a user in cash, by electronic cash, or the like, and refunds cash to the user.

The display unit 33, which is controlled by the controller 35, displays various types of information to a user. The operation input unit 32 receives various operations from a user. In the present exemplary embodiment, the display unit 33 and the operation input unit 32 described above form a touch panel.

The data receiving/transmitting unit 34 receives/transmits data from/to an external apparatus such as the management server 20 over the network 30.

The image output unit 38 outputs an image on a recording medium such as printing paper. The image reading unit 36 reads an image on a recording medium such as a document which is set to a document reading apparatus or the like.

On the basis of various operation instructions from a user which are input by the user by using the operation input unit 32, the controller 35 performs a printing process using the image output unit 38 and a scanning process using the image reading unit 36.

When the image forming apparatus 10 performs a printing process or a copying process, the controller 35 first causes the display unit 33 to display an output fee for the printing process or the copying process. After it is confirmed that the user has paid the displayed fee through the fee adjustment unit 31, the controller 35 controls the image reading unit 36 or the image output unit 38 so as to perform the printing process or the copying process.

Thus, when an individual user uses the image forming apparatus 10, fee payment is received before execution of various processes. Accordingly, a process such as authentication is not performed.

In contrast, there is a usage form in which a company makes, in advance, such a corporate contract that fees charged when employees of the company use the image forming apparatus 10 are paid at a certain future date collectively by the company. In the case of such a usage form, a user ID and a password are set in advance to each employee of the company which has made the corporate contract. Each employee inputs their user ID and password to the image forming apparatus 10 to perform corporate authentication. Thus, each employee may perform a copying process or a printing process without paying their fee for the process on site.

In this usage form, assume the case in which a certain user wants to output, from the image forming apparatus 10, mixed images having images, for which the certain individual user themselves is to pay the output fee, and images, for which a company is to pay the output fee. This case raises a problem that the user has to pay all of the output fee at their own expense first, and has to adjust the output fee for corporate use, which is to be processed as the company's cost, later.

For example, the following case will be described: a certain user, who is an insurance salesman as their first job and is a seminar presenter as their second job, wants to pay the fee for material for selling insurance, at their company's expense, and wants to pay the fee for material for their seminar presentation at their own expense.

In this case, when the user uses the image forming apparatus 10 to print image data including both material for selling insurance and material for their seminar presentation, the user has to pay all of the output fee at their own expense first, and has to charge their company for the output fee for the material for selling insurance. This process is troublesome.

On the company side, regardless of making a corporate contract, the company has to adjust the expense, resulting in wasteful consumption of human resources for adjusting the expense.

Accordingly, the image forming system according to the present exemplary embodiment enables the processes described below to be performed. Thus, even when mixed image output including image output, for which an individual is to pay the fee, and image output, for which a company is to pay the fee, is performed at the same time, it is not necessary to adjust the expense later, and the individual and the company may be charged for the respective fees for image output.

Specifically, the controller 35 of the image forming apparatus 10 according to the present exemplary embodiment first charges an individual for a fee so as to output, from the image output unit 38, mixed images having images, for which the individual is to pay a fee, and images, for which a company which is a charge destination different from the individual is to pay a fee. Then, the controller 35 exerts control so that, when the images, for which the company is to pay a fee, are read by using the image reading unit 36, the output fee for the images, which are read by the image reading unit 36, is switched from the output fee charged to the individual, to the output fee that is to be paid by the company.

After the fee adjustment unit 31 confirms the individual's payment of the output fee, the controller 35 causes the image output unit 38 to output the mixed images having images, for which the individual is to pay the output fee, and images, for which the company is to pay the output fee.

Output of mixed images having images, for which an individual is to pay the output fee, and images, for which a company is to pay the output fee, is not limited to the case in which a single print instruction causes the two types of images to be output. For example, assume the case in which images, for which an individual is to pay the output fee, are output at a certain time and images, for which a company is to pay the output fee, are output at another time. Even in this case, if the total of the output fees of output of the two types of images is paid collectively through a payment method, such as electronic money, cash, or credit payment, this case corresponds to output of mixed images having images, for which an individual is to pay the output fee, and images, for which a company is to pay the output fee.

The controller 35 transmits, to the user, an instruction to read the output results, that is, the print results, for corporate use by using the image reading unit 36.

When, according to the instruction, the user sets, to the image reading unit 36, the output results corresponding to pages for corporate use, the controller 35 causes the image reading unit 36 to read images of the set output results for corporate use.

The controller 35 refunds, to the individual, the output fee for the images read by the image reading unit 36, and charges it as the output fee that is to be paid by the company. Thus, the charge destination is switched to the company.

In the present exemplary embodiment, an operator, who stands in front of the image forming apparatus 10 and performs an image output operation, is an individual user. Therefore, the controller 35 refunds cash to the individual user.

Operations of the image forming system according to the present exemplary embodiment will be described in detail by referring to drawings.

Figure 4:
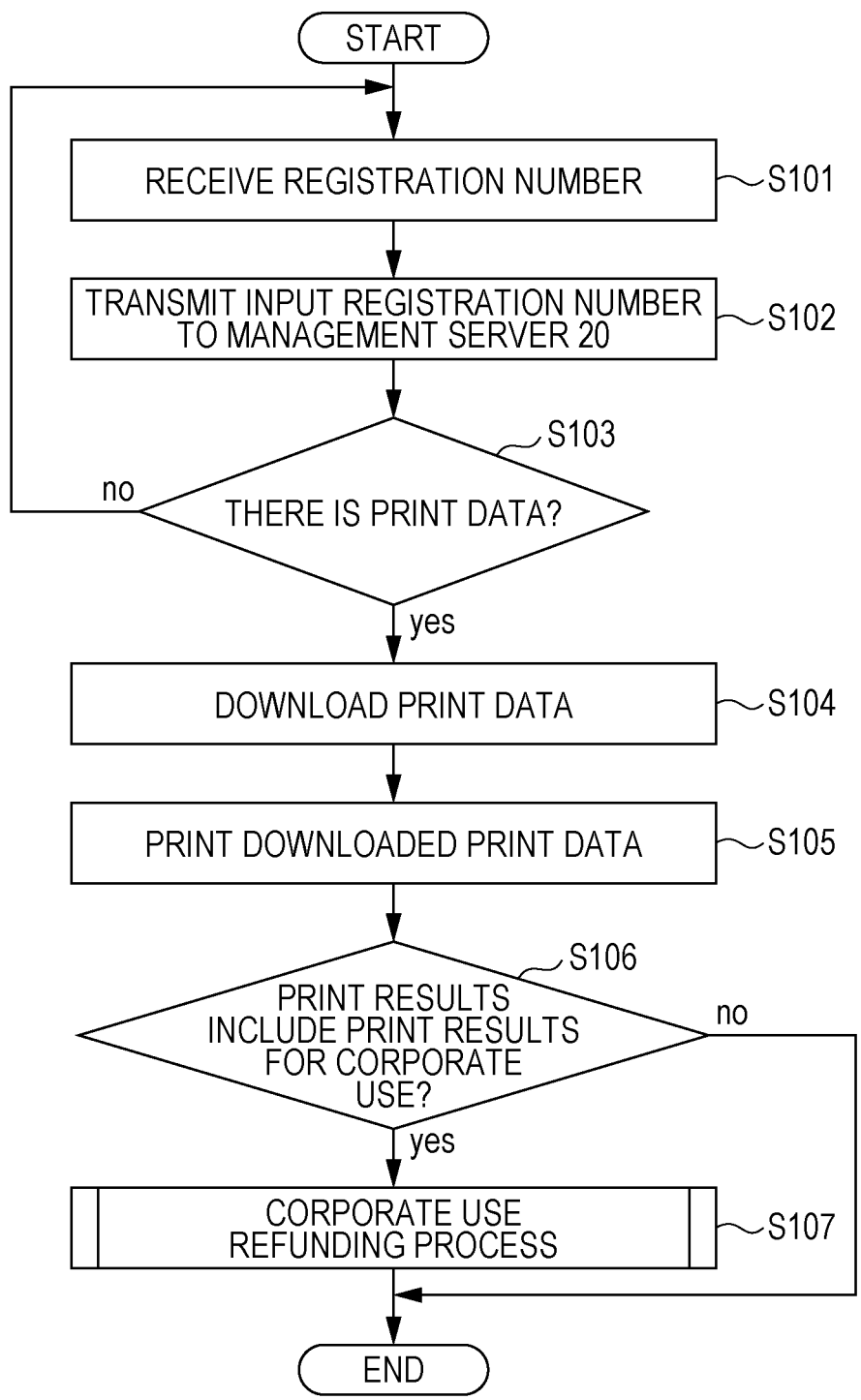
FIG. 4 is a flowchart of operations of an image forming apparatus according to an exemplary embodiment of the present disclosure.

Operations of the image forming apparatus 10 according to the present exemplary embodiment will be described by referring to the flowchart in FIG. 4.

Description will be made on the precondition that an individual user registers, in the management server 20, mixed image data having images, for which the individual is to pay the output fee, and images, for which a company is to pay the output fee, and has an issued registration number in advance.

In this state, the user goes to the image forming apparatus 10 which receives the registration number through the operation input unit 32 in step S101.

In step S102, the controller 35 transmits the input registration number to the management server 20 through the data receiving/transmitting unit 34.

The management server 20 determines whether or not there is print data associated with the transmitted registration number, and the determination result is transmitted to the image forming apparatus 10.

If it is determined that print data associated with the registration number is stored in the management server 20 in step S103, the controller 35 downloads the print data from the management server 20 in step S104.

In step S105, the controller 35 controls the image output unit 38 to print the downloaded print data.

Upon completion of the printing process, in step S106, the controller 35 transmits, to the user, an inquiry about whether or not the print results include print results for corporate use.

If the user performs an operation indicating that the print results do not include print results for corporate use in step S106, the controller 35 ends the process.

If the user performs an operation indicating that the print results include print results for corporate use in step S106, the controller 35 refunds the fee for corporate use in step S107.

Figure 5:
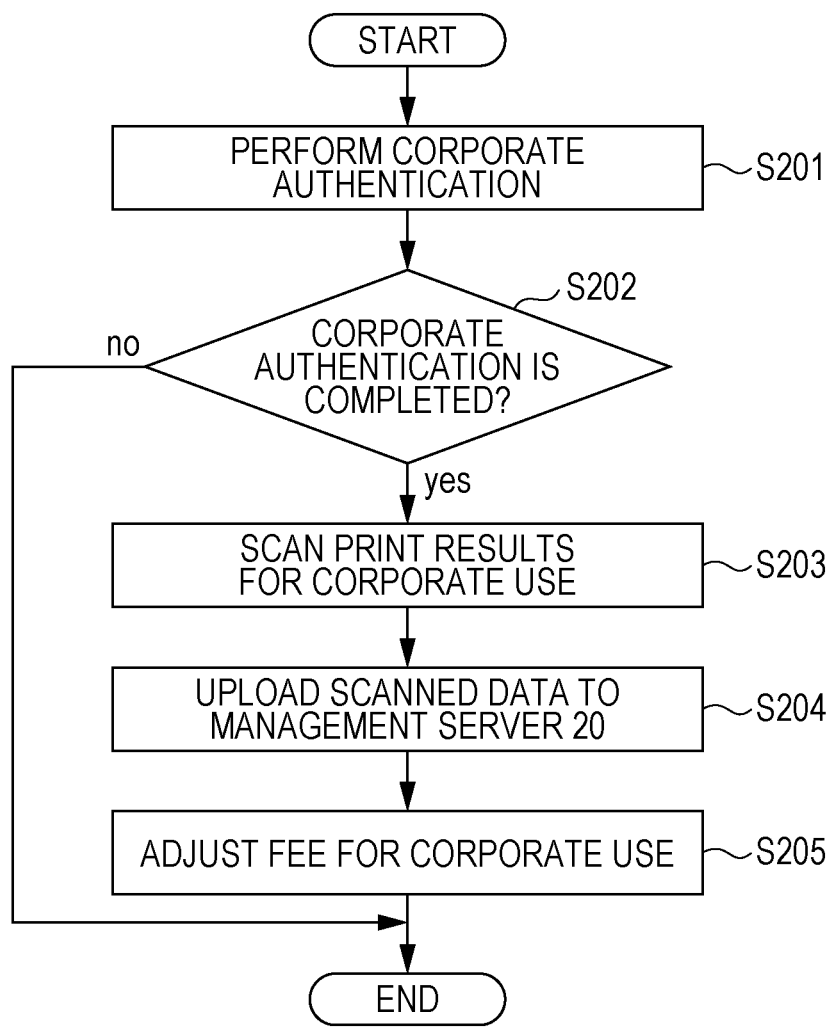
FIG. 5 is a flowchart for describing the details of the process in step S107 in the flowchart in FIG. 4.

The details of the process in step S107 of refunding the fee for corporate use will be described by referring to the flowchart in FIG. 5.

In step S201, the controller 35 requests the user to input the user ID and the password so that corporate authentication is performed. The corporate authentication indicates an authentication process for identifying a company to which the user belongs.

In step S202, if the corporate authentication is successfully completed and the company to which the user belongs is identified, the controller 35 displays, on the display unit 33, an instruction to scan only print results for corporate use, and performs a scanning process on the print results for corporate use in step S203.

In step S204, the controller 35 transmits the scanned data for the print results for corporate use to the management server 20 through the data receiving/transmitting unit 34.

Then, information about the output fee for the print results for corporate use is transmitted from the management server 20. In step S205, the controller 35 makes adjustment by refunding the output fee for corporate use in cash to the individual user.

At that time, the management server 20 may check if the transmitted scanned data actually indicates print results for corporate use, and may transmit the check result to the image forming apparatus 10.

In this case, only when the image data stored in the management server 20 is verified, the controller 35 refunds the output fee for the images read by the image reading unit 36, to the individual user.

Figure 6:
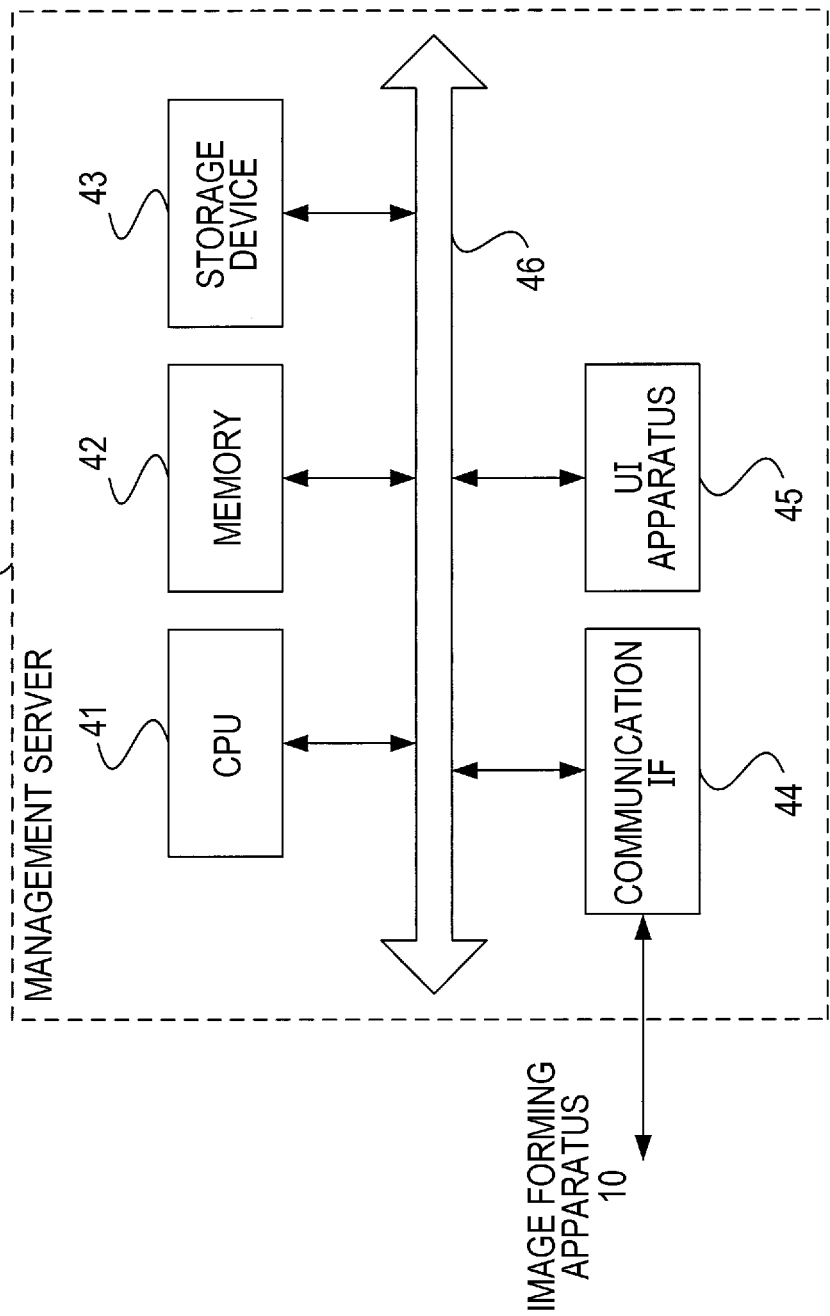
FIG. 6 is a diagram illustrating the hardware configuration of a management server according to an exemplary embodiment of the present disclosure.

FIG. 6 illustrates the hardware configuration of the management server 20 described above.

As illustrated in FIG. 6, the management server 20 includes a CPU 41, a memory 42, a storage device 43 such as a hard disk drive, a communication IF 44 receiving/transmitting data from/to the image forming apparatus 10 and other external apparatuses through a communication network, and a UI apparatus 45. These components are connected to each other through a control bus 46.

The CPU 41 performs given processes on the basis of control programs, which are stored in the memory 42 or the storage device 43, so as to control operations of the management server 20. In the present exemplary embodiment, the CPU 41 reads and executes the control programs stored in the memory 42 or the storage device 43. Alternatively, the programs may be stored in a storage medium, such as a USB memory or a CD-ROM, and may be provided to the CPU 41.

Figure 7:
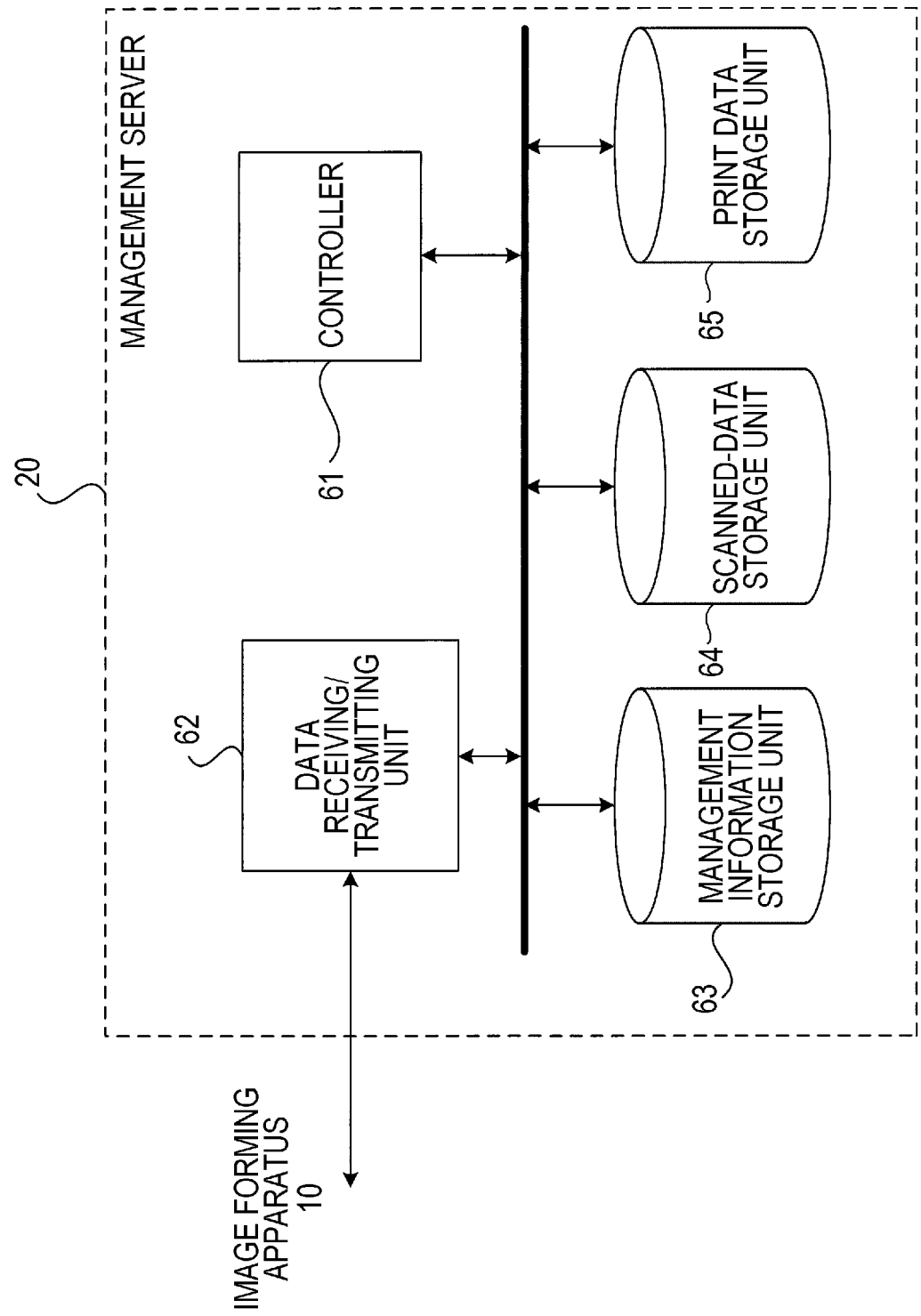
FIG. 7 is a block diagram illustrating the functional configuration of a management server according to an exemplary embodiment of the present disclosure.

FIG. 7 is a block diagram illustrating the functional configuration of the management server 20 implemented through execution of the control programs.

As illustrated in FIG. 7, the management server 20 according to the present exemplary embodiment includes a controller 61, a data receiving/transmitting unit 62, a management information storage unit 63, a scanned-data storage unit 64, and a print data storage unit 65.

The print data storage unit 65 stores print data, which is registered in advance by users and which is used to print images, in association with issued registration numbers. That is, the print data storage unit 65 stores images that are to be output by the image forming apparatus 10.

The data receiving/transmitting unit 62 receives/transmits data from/to the image forming apparatus 10 over the network 30, and performs processes, such as reception of image data and transmission of a registration number, with users' terminal apparatuses.

When the controller 61 receives a registration number from the image forming apparatus 10 through the data receiving/transmitting unit 62, the controller 61 reads print data corresponding to the received registration number from the print data storage unit 65, and transmits the print data to the image forming apparatus 10.

The scanned-data storage unit 64 stores image data of images for corporate use, which are read by the image reading unit 36 of the image forming apparatus 10, in a state in which the image data is verifiable. The word "being verifiable" means that it may be determined, at a later time point, whether or not the output fee for the images is really to be paid by the company. That is, the case in which scanned data is stored at the original resolution indicates that the scanned data is stored in a state in which the scanned data is verifiable. In addition, the following case also indicates that the scanned data is stored in a state in which the scanned data is verifiable: the scanned data, whose data amount has been reduced through reduction in the resolution or execution of data compression to such a degree that the content of the image may be grasped, is stored.

The management information storage unit 63 stores various types of management information, such as a user ID management table, a unit price table, and scanned-data management information.

FIG. 8 illustrates an exemplary user ID management table stored in the management information storage unit 63.

The user ID management table illustrated in FIG. 8 shows that information about the user ID, information about the corporate ID, and information about its corporate name are associated with one another. The user ID management table enables identification of a company, to which a certain user belongs, from the user ID of the user.

FIG. 9 illustrates an exemplary unit price table stored in the management information storage unit 63.

In the unit price table illustrated in FIG. 9, a unit price per page is registered for each set of a corporate ID, a color mode, and a sheet size. The unit price table enables calculation of an output fee by multiplying the page count by the unit price if the output conditions, such as the color mode and the sheet size, and a company are specified.

FIG. 10 illustrates exemplary scanned-data management information stored in the management information storage unit 63.

The scanned-data management information illustrated in FIG. 10 is used to manage scanned data transmitted from the image forming apparatus 10. In the scanned-data management information, information about the user ID, the registration day, hour, minute, and second, the color mode, the sheet size, and the page count, as well as information about the storage destination of scanned data, are associated with each other.

Specific operation screen examples on the image forming apparatus 10 used in the process described above will be described by referring to FIGS. 11 to 18.

FIG. 11 illustrates an operation screen example, which is used when a user inputs a registration number, on the image forming apparatus 10. FIG. 11 illustrates an operation screen used when a user inputs a registration number, "AQ745JY2F", issued from the management server 20.

Figure 12:
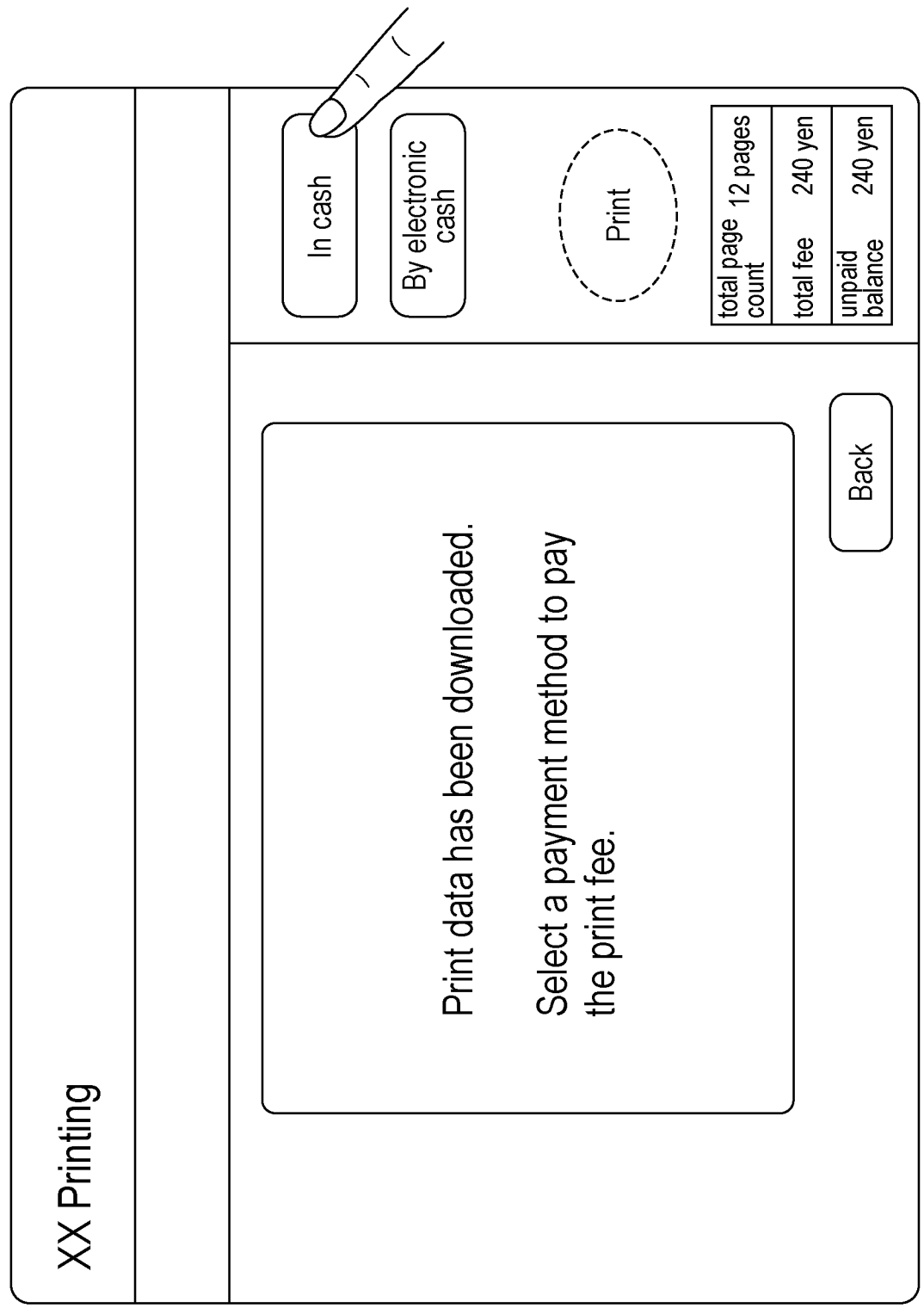
FIG. 12 is a diagram for describing a concrete operation screen example on an image forming apparatus.

FIG. 12 illustrates an operation screen example displayed after input of a registration number. FIG. 12 illustrates an operation screen example displayed when print data associated with the input registration number is downloaded from the management server 20 and the user is prompted to pay the print fee.

Figure 13:
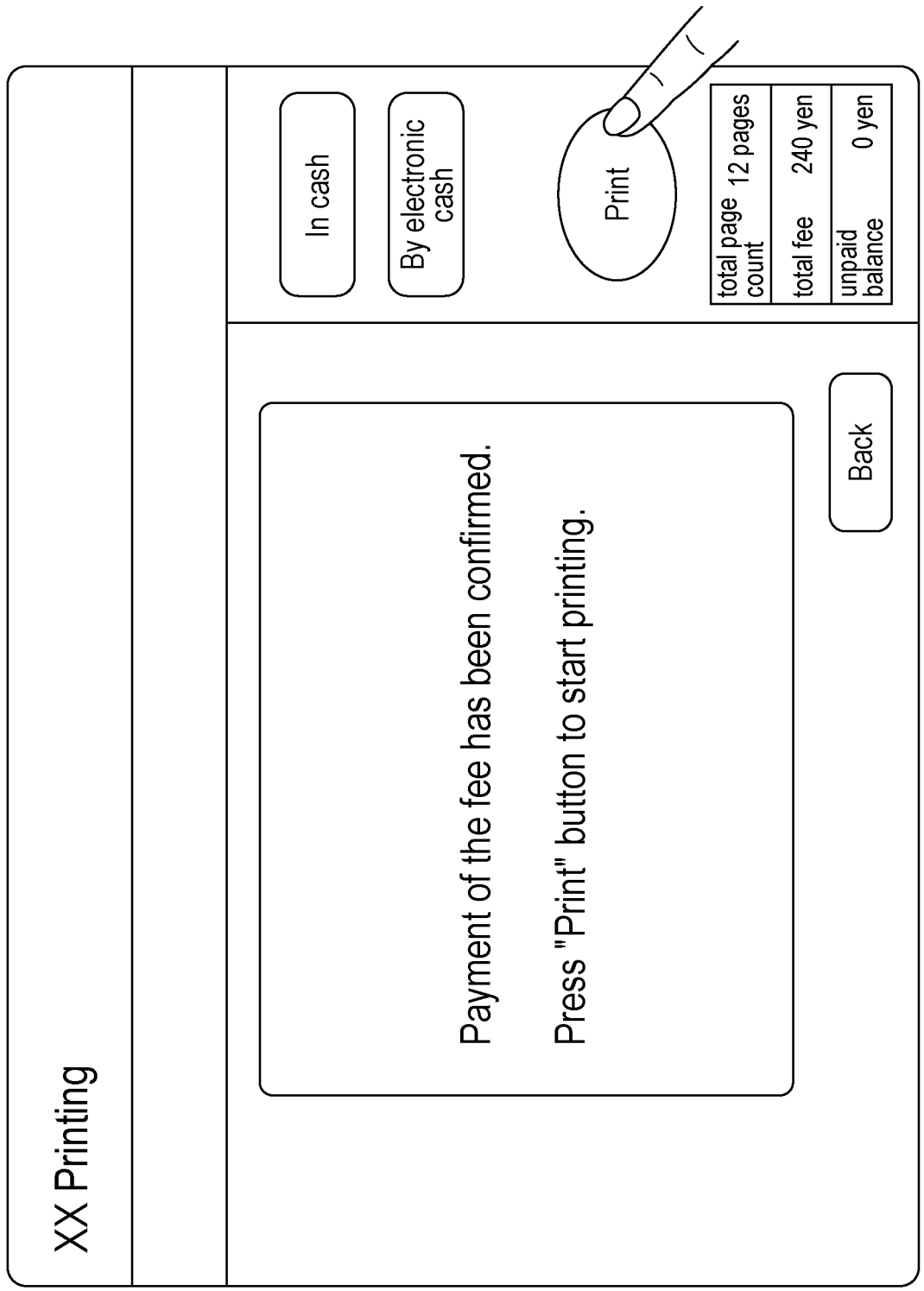
FIG. 13 is a diagram for describing a concrete operation screen example on an image forming apparatus.

When the user pays the print fee according to the operation screen as illustrated in FIG. 12, an operation screen as illustrated in FIG. 13 is displayed.

On the operation screen illustrated in FIG. 13, since the user's payment of the print fee is confirmed, the user is prompted to start the printing process.

On the operation screen as illustrated in FIG. 13, the user operates the "Print" button. Thus, the printing process is started, and print results are output from the image forming apparatus 10.

Figure 14:
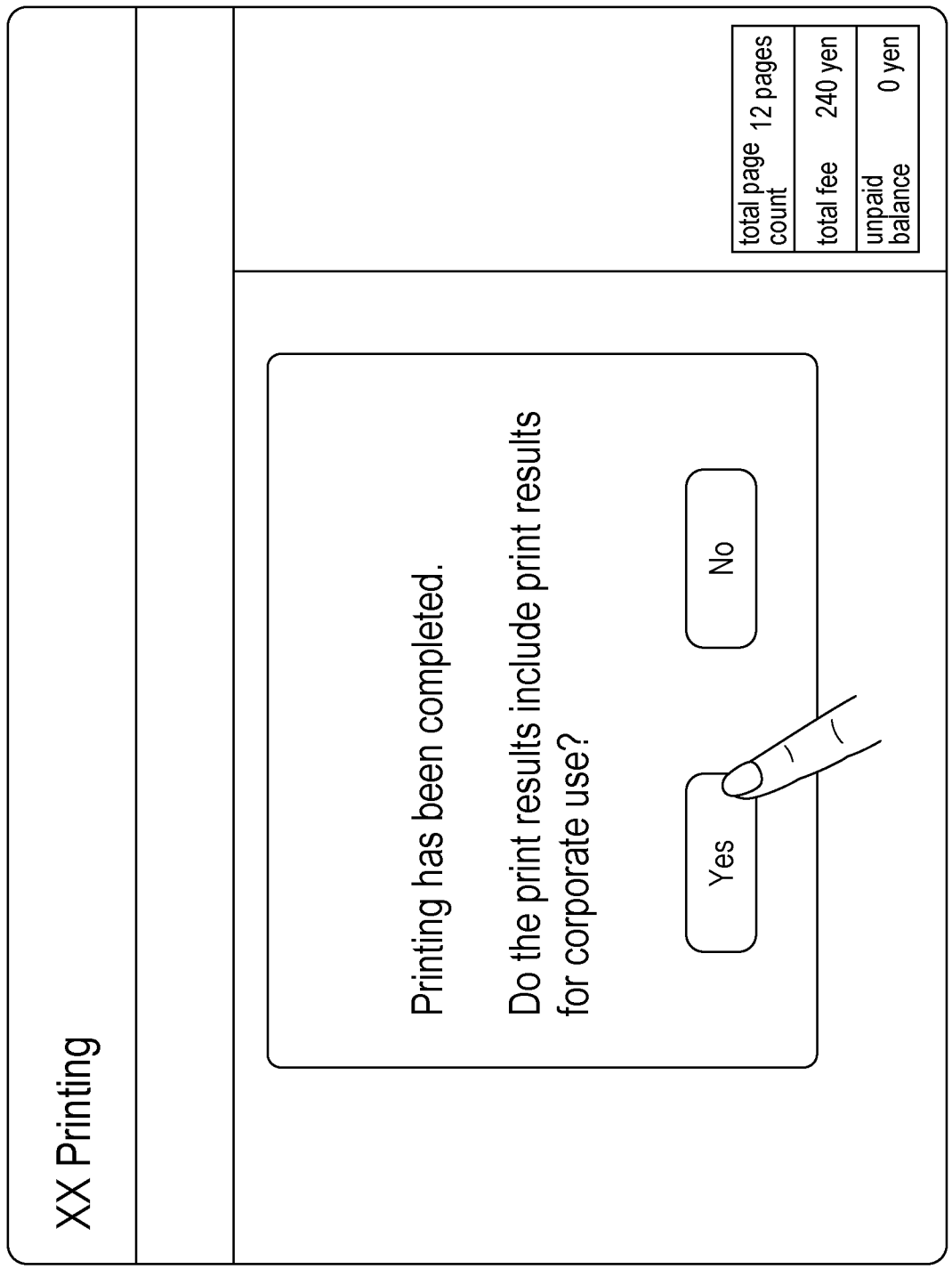
FIG. 14 is a diagram for describing a concrete operation screen example on an image forming apparatus.

An operation screen as illustrated in FIG. 14 is displayed on the image forming apparatus 10, and whether or not the print results include print results for corporate use is checked with the user.

On the operation screen illustrated in FIG. 14, when the user selects "No", the process ends. On the operation screen illustrated in FIG. 14, when the user selects "Yes", a process of refunding the fee for corporate use, as illustrated in FIG. 5, is started.

Figure 15:
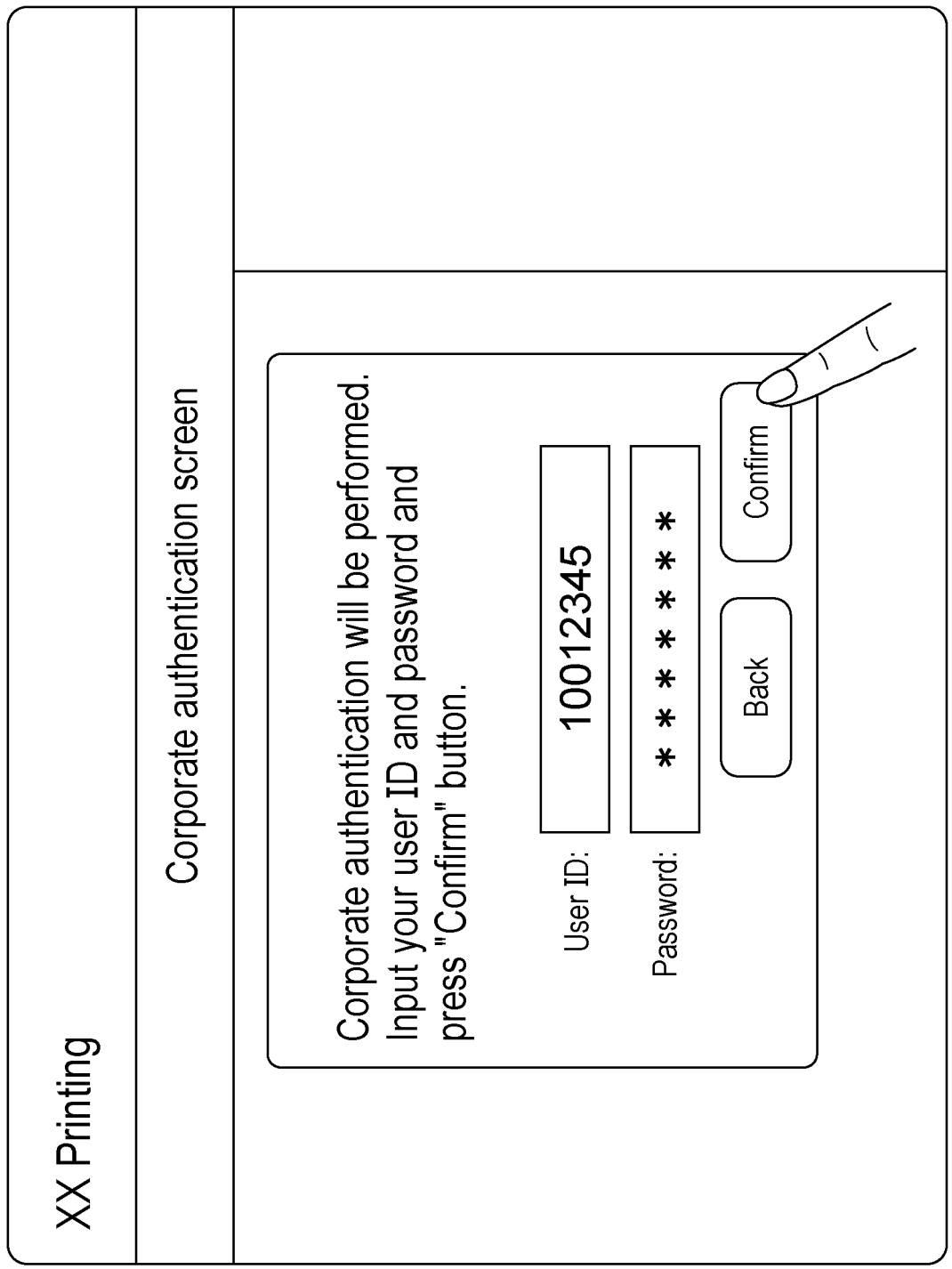
FIG. 15 is a diagram for describing a concrete operation screen example on an image forming apparatus.

In the process of refunding the fee for corporate use, an operation screen as illustrated in FIG. 15 is first displayed, and corporate authentication is performed. In corporate authentication, the user is requested to input their user ID and password.

The user inputs their user ID and password which are given in advance from the company to which the user belongs. Thus, the company to which the user belongs is identified.

Figure 16:
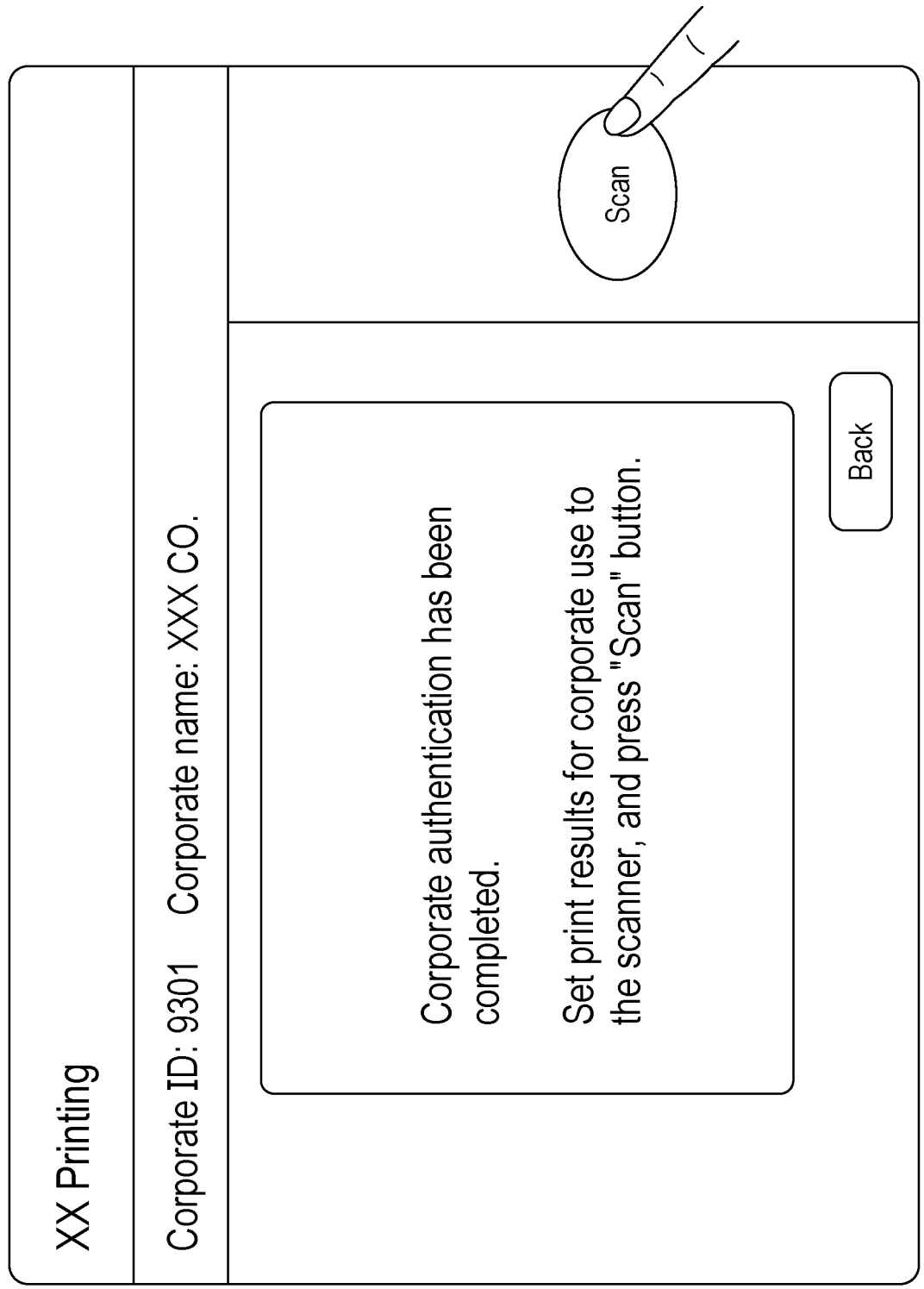
FIG. 16 is a diagram for describing a concrete operation screen example on an image forming apparatus.

In successful completion of the corporate authentication, an operation screen as illustrated in FIG. 16 is displayed. The user is instructed to set print results for corporate use to the scanner and start a scanning process.

Figure 17:
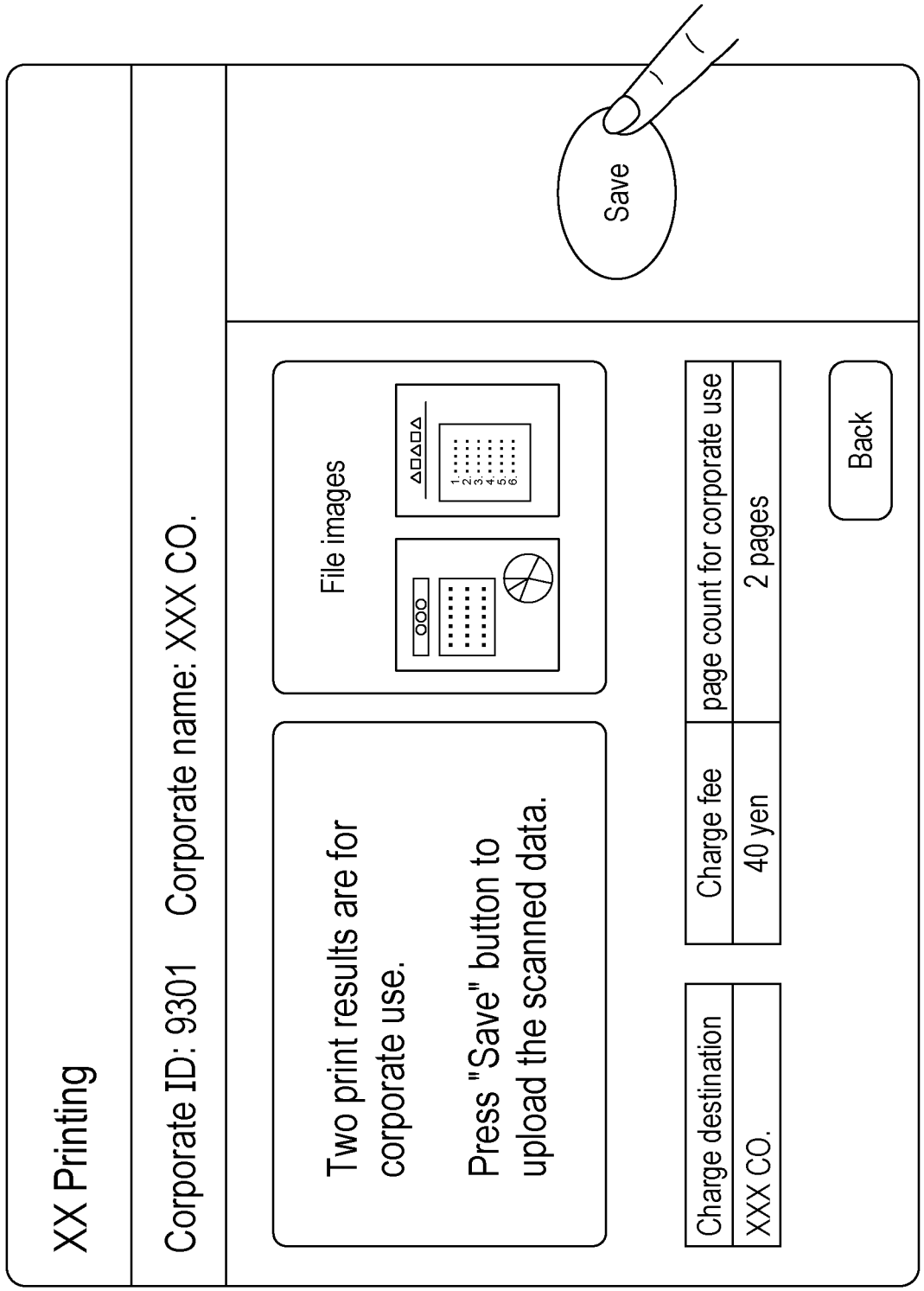
FIG. 17 is a diagram for describing a concrete operation screen example on an image forming apparatus.

When the user scans print results for corporate use, an operation screen as illustrated in FIG. 17 is displayed. Information, for example, about the page count for corporate use, the output fee for corporate use, and the charge destination of the output fee is displayed.

When the user presses the "Save" button on the operation screen in FIG. 17, the scanned data is transmitted to the management server 20 for storage.

Figure 18:
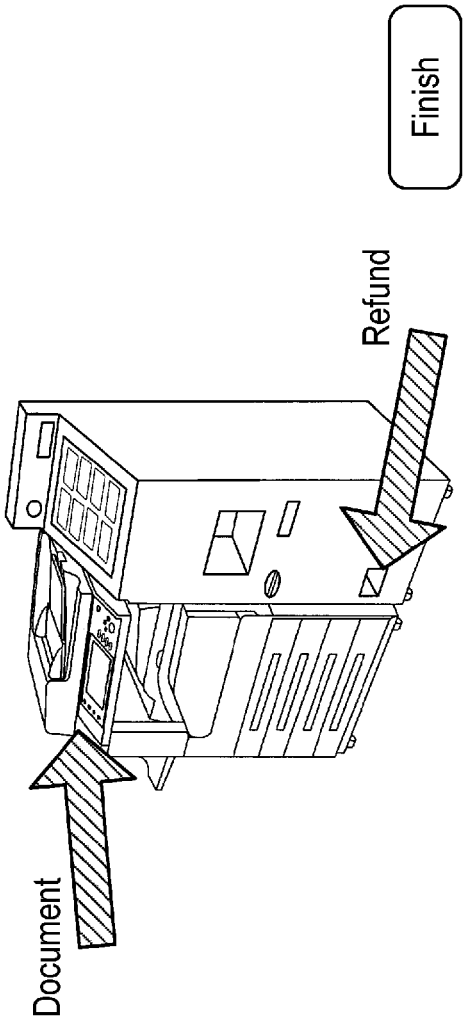
FIG. 18 is a diagram for describing a concrete operation screen example on an image forming apparatus.

The image forming apparatus 10 refunds 40 yen, which corresponds to the corporate use, to the individual user. After that, an operation screen as illustrated in FIG. 18 is displayed, and the process ends.

Figure 19:
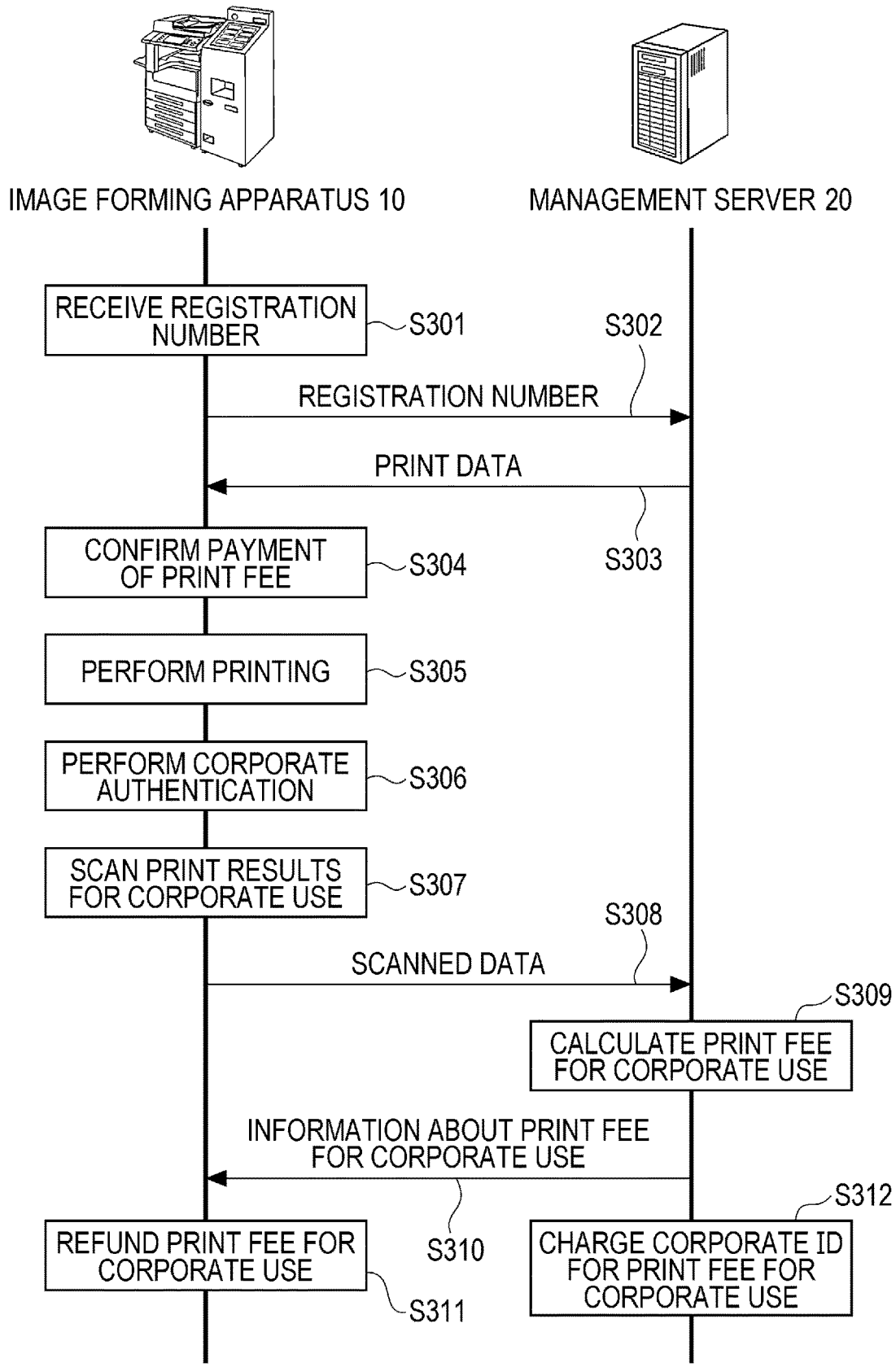
FIG. 19 is a sequence chart for describing data reception/transmission between an image forming apparatus and a management server.

Data reception/transmission between the image forming apparatus 10 and the management server 20 will be described by referring to the sequence chart in FIG. 19.

In step S301, the image forming apparatus 10 receives an input registration number. In step S302, the image forming apparatus 10 transmits the input registration number to the management server 20.

In step S303, the management server 20 transmits, to the image forming apparatus 10, print data corresponding to the transmitted registration number.

In step S304, the image forming apparatus 10 confirms payment of the print fee. In step S305, the print data is printed.

If the print results include print results for corporate use, the image forming apparatus 10 performs corporate authentication in step S306. In step S307, the print results for corporate use are scanned.

In step S308, the image forming apparatus 10 transmits, to the management server 20, the scanned data obtained by scanning the print results for corporate use.

In step S309, the management server 20, which has received the scanned data from the image forming apparatus 10, calculates the print fee for the print results for corporate use on the basis of the received scanned data and the stored unit price table.

In step S310, the management server 20 returns, to the image forming apparatus 10, information about the calculated print fee for corporate use.

In step S311, the image forming apparatus 10 refunds the print fee for corporate use to the individual user.

In step S312, the management server 20 charges the print fee for corporate use as the fee for the corporate ID identified from the user ID obtained from the individual.

Modified Example

In the exemplary embodiment described above, the case in which an individual user first pays the fee for all of the image output, and in which, after that, the charge destination of the fee for image output for corporate use is switched to the corporate user is described. The present disclosure may be similarly applied to the case in which the payment order is reversed. That is, the present disclosure may be applied to the case in which a corporate user first pays the fee of all of the image output, and in which, after that, the charge destination of the fee for image output for individual use is switched to an individual user.

In this procedure, after the output fee for images read by the image reading unit 36 is received from an individual, the controller 35 of the image forming apparatus 10 may charge a company for the fee obtained by subtracting the output fee for images read by the image reading unit 36, from the total output fee for mixed images having images, for which the company is to pay the output fee, and images, for which the individual is to pay the output fee.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
an image output unit that outputs an image on a recording medium;
an image reading unit that reads an image on a recording medium; and
a controller that charges a first user for a fee so as to output mixed images from the image output unit, the mixed images having a first image and a second image, the first image being an image for which the first user is to pay an output fee, the second image being an image for which a second user is to pay an output fee, the second user being a charge destination different from a charge destination of the first user, and, when the image reading unit reads the second image for which the second user is to pay the output fee, switches an output fee for the image read by the image reading unit, from the output fee charged to the first user, to the output fee that is to be paid by the second user.

2. The image forming apparatus according to claim 1, wherein, after the controller confirms payment of the output fee by the first user, the controller outputs the mixed images from the image output unit, the mixed images having the first image and the second image, the first image being an image for which the first user is to pay the output fee, the second image being an image for which the second user is to pay the output fee.

3. The image forming apparatus according to claim 2, wherein the controller refunds the output fee for the image read by the image reading unit to the first user, charges the output fee as the output fee that is to be paid by the second user, and thus switches the output fee to the output fee that is to be paid by the second user.

4. The image forming apparatus according to claim 3, wherein an operator who is performing an image output operation is the first user, and the controller pays cash back, and thus refunds the cash to the first user.

5. The image forming apparatus according to claim 4, wherein the first user is an individual, and the second user is a company.

6. The image forming apparatus according to claim 2, wherein the first user is an individual, and the second user is a company.

7. The image forming apparatus according to claim 3, wherein the first user is an individual, and the second user is a company.

8. The image forming apparatus according to claim 1, wherein the controller refunds the output fee for the image read by the image reading unit to the first user, charges the output fee as the output fee that is to be paid by the second user, and thus switches the output fee to the output fee that is to be paid by the second user.

9. The image forming apparatus according to claim 8, wherein an operator who is performing an image output operation is the first user, and the controller pays cash back, and thus refunds the cash to the first user.

10. The image forming apparatus according to claim 9, wherein the first user is an individual, and the second user is a company.

11. The image forming apparatus according to claim 8, wherein the first user is an individual, and the second user is a company.

12. The image forming apparatus according to claim 1, wherein the first user is an individual, and the second user is a company.

13. The image forming apparatus according to claim 1, wherein the first user is a company, and the second user is an individual.

14. The image forming apparatus according to claim 13, wherein, when the output fee for the image read by the image reading unit is received from the second user, the controller charges, for the first user, a fee obtained by subtracting the output fee for the image read by the image reading unit from the output fee for the mixed images having the first image and the second image, the first image being an image for which the first user is to pay the output fee, the second image being an image for which the second user is to pay the output fee, the second user being a charge destination different from the charge destination of the first user.

15. An information processing system comprising:
an image forming apparatus including
- an image output unit that outputs an image on a recording medium,
- an image reading unit that reads an image on a recording medium, and
- a controller that charges a first user for a fee so as to output mixed images from the image output unit, the mixed images having a first image and a second image, the first image being an image for which the first user is to pay an output fee, the second image being an image for which a second user is to pay an output fee, the second user being a charge destination different from a charge destination of the first user, and, when the image reading unit reads the second image for which the second user is to pay the output fee, switches an output fee for the image read by the image reading unit, from the output fee charged to the first user, to the output fee that is to be paid by the second user; and a management apparatus including a storage unit that stores an image which is to be output by the image forming apparatus, and that stores image data of an image in a state in which the image data is verifiable, the image being read by the image reading unit and being an image for which the second user is to pay a fee.

16. The information processing system according to claim 15, wherein, when the image data stored in the storage unit in the management apparatus is verified, the controller refunds, to the first user, the output fee for the image read by the image reading unit.

17. A non-transitory computer readable medium storing a program causing a computer to execute a process comprising:
- outputting mixed images from an image output unit by charging a first user for a fee, the mage output unit outputting an image on a recording medium, the mixed images having a first image and a second image, the first image being an image for which the first user is to pay an output fee, the second image being an image for which a second user is to pay an output fee, the second user being a charge destination different from a charge destination of the first user; and
- when an image reading unit reads the second image for which the second user is to pay the output fee, switching an output fee for the image read by the image reading unit, from the output fee charged to the first user, to the output fee that is to be paid by the second user, the image reading unit reading an image on a recording medium.

* * * * *